United States Patent
Esliger et al.

(10) Patent No.: US 8,156,317 B2
(45) Date of Patent: Apr. 10, 2012

(54) INTEGRATED CIRCUIT WITH SECURE BOOT FROM A DEBUG ACCESS PORT AND METHOD THEREFOR

(75) Inventors: James Lyall Esliger, Richmond Hill (CA); Denis Foley, Shrewsbury, MA (US)

(73) Assignee: ATI Technologies ULC, Markham, Ontario (CA)

( * ) Notice: Subject to any disclaimer, the term of this patent is extended or adjusted under 35 U.S.C. 154(b) by 969 days.

(21) Appl. No.: 12/122,484

(22) Filed: May 16, 2008

(65) Prior Publication Data

US 2009/0288160 A1 Nov. 19, 2009

(51) Int. Cl.
*G06F 15/177* (2006.01)

(52) U.S. Cl. ............ 713/2; 726/17; 726/24; 726/26; 711/163; 714/25; 714/36

(58) Field of Classification Search .......... 713/1, 2; 726/17, 24, 26; 711/163; 714/25, 36
See application file for complete search history.

(56) References Cited

U.S. PATENT DOCUMENTS 7,444,476 B2 * 10/2008 Gnanasabapathy et al. .. 711/141
7,657,722 B1 * 2/2010 De Angel et al. ............. 711/163
2002/0065646 A1 * 5/2002 Waldie et al. ................. 703/26
2007/0162759 A1 * 7/2007 Buskey et al. ................ 713/182
2008/0115113 A1 * 5/2008 Codrescu et al. ............. 717/127

OTHER PUBLICATIONS

OMTP Hardware Working Group, OMTP Hardware Requirements and Defragmentation, Trusted Environment OMTP TR0, pp. 23-26; 42-46; Dated Mar. 27, 2006.

* cited by examiner

*Primary Examiner* — Thuan Du
(74) *Attorney, Agent, or Firm* — Faegre Baker Daniels LLP

(57) ABSTRACT

An integrated circuit (100) may receive a boot loader code (114) via a debug access port (105), wherein a boot logic is operative to block, upon a reset (123) of the programmable processor (103) from the debug access port (105), commands and to the programmable processor from the debug access port, while still allowing the reset (123) command and while allowing write access to memory (112) to receive the boot loader code image (114) written to memory (112). The boot logic also blocks commands to the memory subsystem (109) from the debug access port and turns off write access to memory (112) after allowing the boot loader code image (114) to be written. The boot logic validates the boot loader code image (114) by performing a security check and jumps to the boot loader code image (114) if it is valid, thereby allowing it to run on the programmable processor (103). The boot logic may be logic circuits, software or a combination thereof.

20 Claims, 6 Drawing Sheets

INTEGRATED CIRCUIT WITH SECURE BOOT FROM A DEBUG ACCESS PORT AND METHOD THEREFOR

FIELD OF THE DISCLOSURE

The present disclosure is related to integrated circuit software generally, and more specifically to secure boot of integrated circuit processors.

BACKGROUND

Integrated circuits such as System On Chip (SOC) integrated circuits provide debugging ports such that the integrated circuit may be checked, that is, debugged by appropriate hardware and software connecting to the integrated circuit via debugging ports. For example, IEEE 1149.1, "Standard Test Access Port and Boundary Scan Architecture," which is commonly referred to as the "JTAG" (Joint Test Action Group) standard, originally defined test access ports for printed circuit board testing but is now used extensively for integrated circuits. Debug ports such as those defined by the JTAG Standard may allow access to various sub-blocks of the integrated circuit such as memory, registers and flip flops of the device, all of which may store proprietary software or other confidential information.

Debug ports such as JTAG debug ports may also allow a user to load code onto an integrated circuit or various sub-blocks of the integrated circuit and run those code portions in order to implement various debugging functions. However, as would be understood by one of ordinary skill, these features may also enable hackers or other malicious users to run unauthorized code on the integrated circuit or to control various integrated circuit sub-blocks and thereby extract confidential and proprietary software or other information.

As would be understood by one of ordinary skill, software may be loaded into the integrated circuit via a debug port for the purposes of rebooting the integrated circuit. By booting the integrated circuit with a malicious code, a hacker may be able to gain access to various data stored on the integrated circuit, or stored in the platform on which the integrated circuit resides, that would not otherwise be accessible.

Therefore, it would be desirable to verify any code loaded into an integrated circuit or its sub-blocks via any debug ports. Particularly it would be desirable to verify any that may be used for booting the integrated circuit.

At the same time authorized debuggers should have the capability to install and run appropriate debugging software on the integrated circuit or any of its components as needed in order to run tests on the integrated circuit.

DETAILED DESCRIPTION

Figure 1:
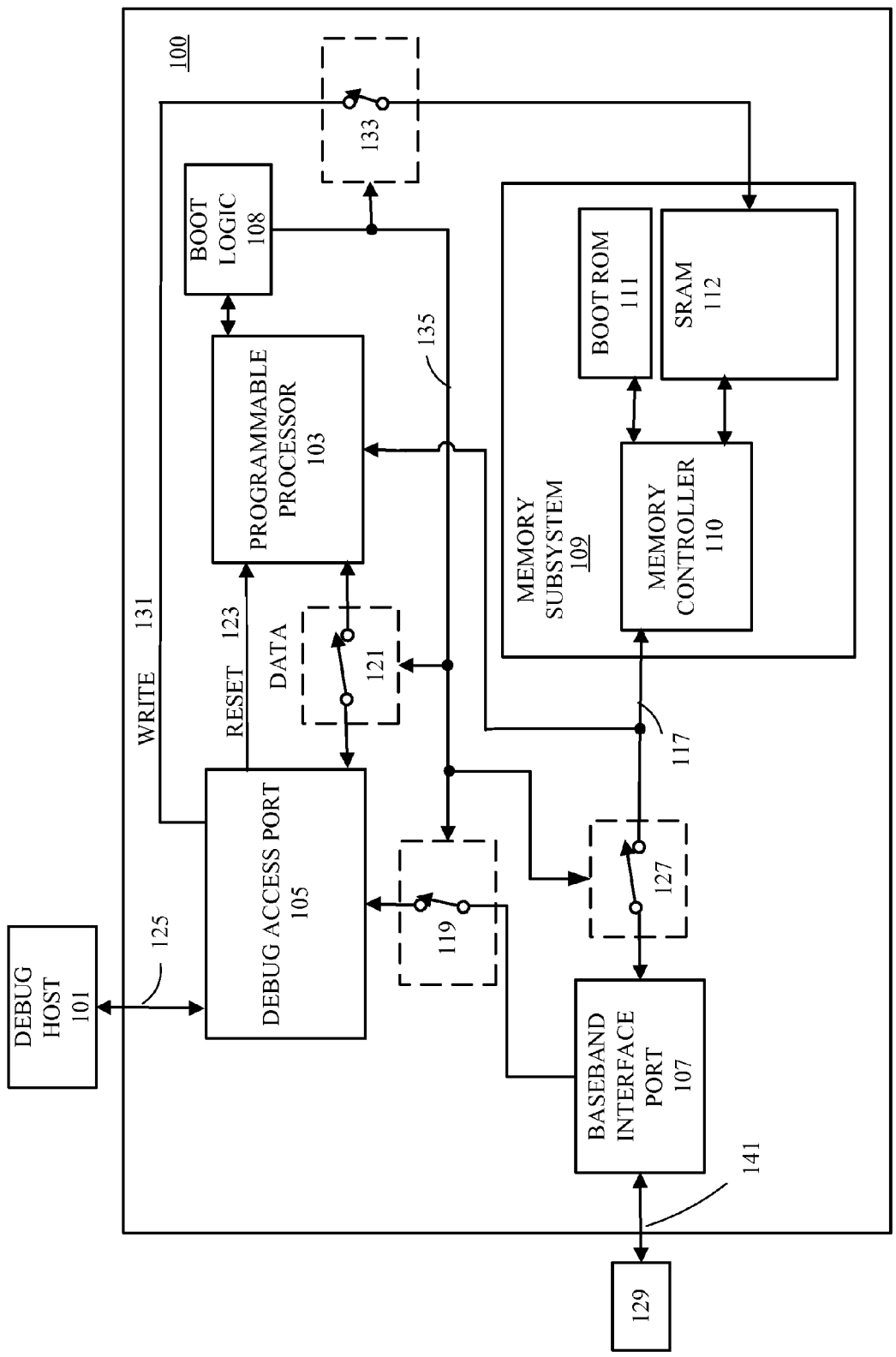
FIG. 1 is a block diagram of an integrated circuit in accordance with an embodiment.

The embodiments disclosed include a method comprising receiving a programmable processor reset command from a debug access port of an integrated circuit; halting the programmable processor in response to the reset command while the reset command is asserted; blocking, by a boot logic upon the reset of the programmable processor, commands to the programmable processor from the debug access port, while still allowing the reset command to the programmable processor from the debug port; and allowing, by the boot logic, write access to memory by the debug access port to receive a boot loader code image written to the memory. The method may include blocking, by the boot logic upon the reset command, commands to a memory subsystem from the debug access port. The method may also include validating, by the boot logic, the boot loader code image as valid code by performing a security check on the boot loader code image; and jumping, by the boot logic, to the boot loader code image thereby allowing the boot loader code image to run on the programmable processor.

The described embodiments also include an integrated circuit with a debug access port; a programmable processor coupled to the debug access port where the programmable processor is operative to receive a reset command from the debug access port, and to transmit data to, and receive data from, the debug access port; and a boot logic, operative to block, upon a reset of the programmable processor corresponding to a reset command from the debug access port, commands and to the programmable processor from the debug access port, while still allowing the reset command to the programmable processor from the debug port; and while allowing write access to memory by the debug access port to receive a boot loader code image written to the memory. The integrated circuit may further include a memory system operatively coupled to the debug access port; and wherein the boot logic is further operative to block, upon reset of the programmable processor, commands to the memory subsystem from the debug access port.

The embodiments also include an integrated circuit comprising a debug access port; a memory system operatively coupled to the debug access port; a programmable processor coupled to the debug access port; the programmable processor operative to receive a reset command from the debug access port, and to transmit data to, and receive data from, the debug access port; and a boot logic, operative to block, upon a reset of the programmable processor corresponding to a reset command from the debug access port, commands to the programmable processor from the debug access port, while still allowing the reset command to the programmable processor from the debug port; and while allowing write access to memory by the debug access port to receive a boot loader code image written to the memory; block, upon reset of the programmable processor, commands to the memory subsystem from the debug access port; turn off the write access to the memory via the debug access port after allowing a boot loader code image to be written to the memory via the debug access port; validate that the boot loader code image is valid code by performing a security check on the boot loader code image; and jump to the boot loader code image thereby allowing the boot loader code image to run on the programmable processor.

Turning now to the drawings wherein like numerals represent like components, FIG. 1 is a block diagram of an integrated circuit (IC) 100 which may be a System-on-Chip (SOC) integrated circuit in some embodiments. The IC 100 includes a programmable processor 103 which is coupled to the debug access port 105 by a data line through logic switch 121 and a reset line 123. The programmable processor 103 may be any suitable type of processor, such as, but not limited to, a CPU, graphics processor core, or other suitable programmable processing circuitry. The debug access port 105 may be, for example, a JTAG debug access port. The debug access port 105 may be coupled to a debug host 101 via a physical connection 125. The debug access port 105 is also coupled to a baseband interface port 107. The baseband interface port 107 may be a primary access interface port of the IC 100 to the outside world. For example, a device 129 may be connected to the baseband interface port 107 by a connection 141, where a logic switch 127, allows or blocks bidirectional data flow between the baseband interface port 107 and the memory subsystem 109. The device 129, via the baseband interface port 107, may, if allowed by logic switch 127, access the programmable processor 103 and a memory subsystem 109 via a coupling 117 between the baseband interface port 107, the programmable processor 103 and the memory subsystem 109. The device 129 may be any suitable device that may communicate with the integrated circuit 100, such as, but not limited to, another programmable processor, a baseband processor, etc.

The memory subsystem 109 may include, among other things, a memory controller 110 which is coupled to a random access memory RAM 112 and a boot ROM 111. The term "boot ROM" as used herein may refer to the memory containing boot software, the boot software being a set of executable instructions for executing on, for example, the programmable processor 103. However, as used herein, the term "boot ROM" also refers to the boot software being executed by the programmable processor 103. Therefore, where the boot ROM is said to perform some action herein, this refers to the boot software executing on the CPU and causing the CPU to perform an operation, i.e., to perform some action attributed to the boot ROM.

Additionally, the various embodiments include boot logic circuits such as boot logic 108. The boot logic 108 is operative to control logic switches for blocking or allowing access to various blocks or sub-blocks of the integrated circuit 100. The boot logic 108, is operatively coupled to the programmable processor 103 and may interact with software, firmware, other logic or combinations thereof. For example, the boot logic 108 may work in conjunction with the boot ROM 111. Therefore, in accordance with the embodiments, a boot logic may include software, including the boot ROM 111 software, logic circuits or combinations of software and logic circuits to accomplish the various operations as will be described in further detail herein. Further, various portions of the boot logic may operate independently of other portions of the boot logic at various times of the operation. For example, upon reset of the programmable processor 103, boot logic 108 may operate exclusively during the reset until a software component of the boot logic, for example from the boot ROM 111, is able to resume function after the reset to the programmable processor 103 is de-asserted.

Figure 3:
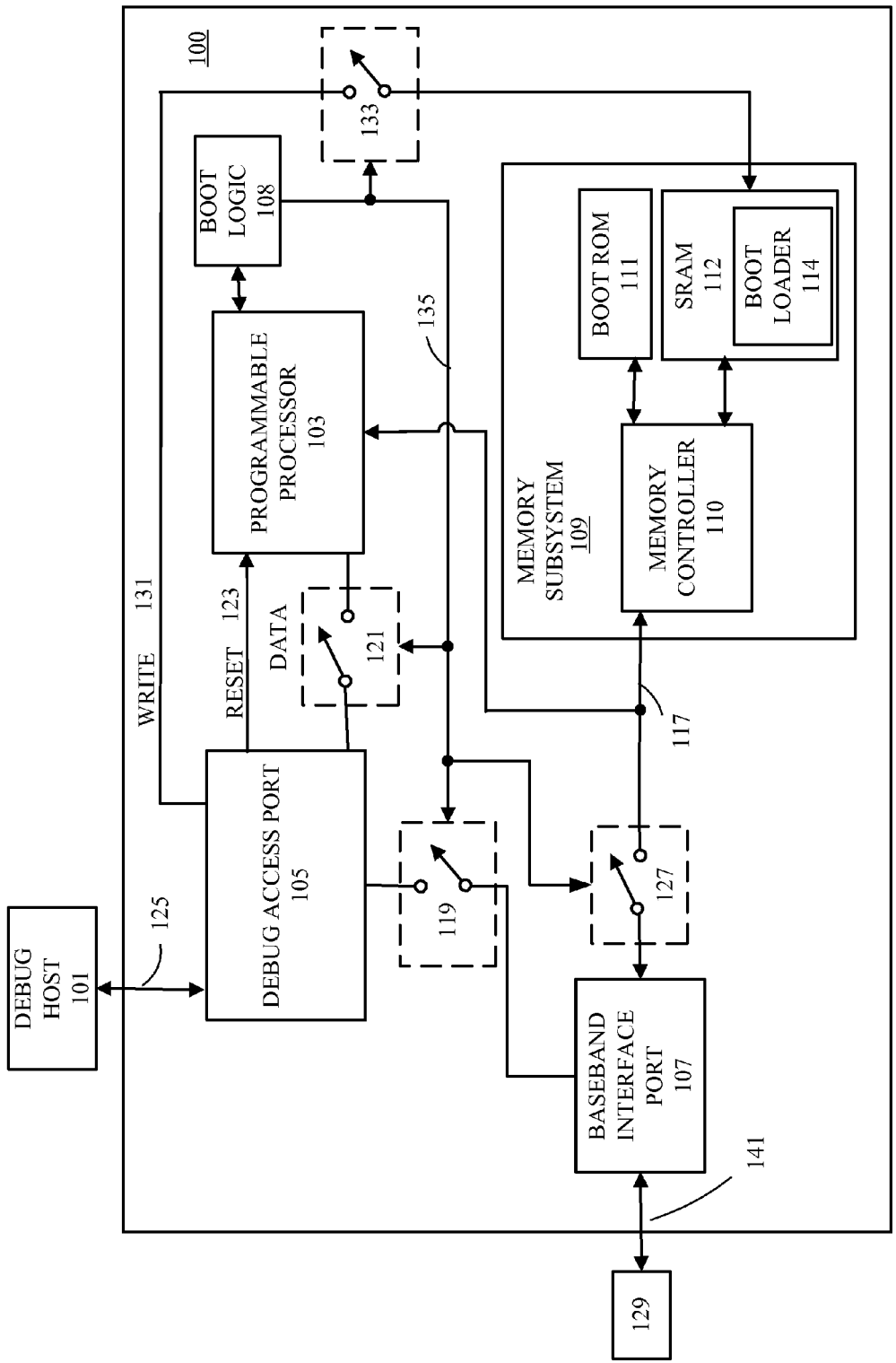
FIG. 3 is a block diagram of the integrated circuit illustrated in FIG. 2, wherein a write access to memory from the debug access port is blocked after a code image is written to the memory. The written code image may be determined to be a boot loader code image.

The RAM 112, which may be a Static RAM (SRAM) in some embodiments, may contain a boot loader image 114 as shown in FIG. 3, for example, after such a boot loader image 114 has been downloaded. The boot loader image 114 is a boot loader code image which may extend the functionality of the boot ROM 111.

The boot loader image 114 may be loaded into RAM 112 via a write command from the debug host 101 via the debug access port 105, which allows write access 131 to the RAM 112. It is to be understood that the write access 131 is for exemplary purposes only and for explaining the various embodiments disclosed herein. Therefore the write access 131 from the debug access port 105 may actually be implemented using the memory controller 110 of the memory subsystem 109. However, for simplicity of illustration and simplicity of explanation the write access 131 is shown as a simple control line from the debug access port 105 directly to the RAM 112 in FIGS. 1, 2 and 3.

In accordance with the embodiments, a boot logic, including the boot logic 108 and the boot ROM 111, has control of data exchange between various sub-blocks of the integrated circuit 100 during booting procedures. For example, the boot logic 108 of the embodiments will control access from the debug access port 105 to baseband interface port 107, programmable processor 103 and RAM 112 using, for example, logic switches 119, 121, 127 and 133, respectively. Note that control by the boot logic 108 may effect other software or hardware logic in the various embodiments and may be accomplished in various manners. For example, logic switches 119, 121, 127 and 133 may be software controls or logic circuits in the various embodiments. Therefore, for simplicity of illustration and explanation the boot logic 108 control functionality is illustrated by way of logic switches 119, 121, 127 and 133. Thus, for example, the boot logic 108 may use control signal 135 to control the position of logic switches 119, 121, 127 and 133 thereby allowing or disallowing access between various sub-blocks of the integrated circuit 100.

For example, the boot logic 108 may apply the control signal 135 to cause logic switch 119 to open thereby restricting the debug access port 105 from access to the baseband interface port 107 and thus also prevent the debug access port 105 from accessing the memory subsystem 109. The boot logic 108 may prevent access, via the baseband interface port 107, to memory by any external device, such as device 129, by controlling logic switch 127 to block access to the memory subsystem 109 via the baseband interface port 107. The boot logic 108 and/or the boot ROM 111 of the embodiments may also prevent the debug access port 105 from having write access 131 to the RAM 112 by opening, for example logic switch 133. Therefore the control signal 135 may represent a control bus within integrated circuit 100 wherein the boot logic 108 may send access grant or access restriction commands to the appropriate logic circuits and/or software and/or firmware modules to grant access or prevent access to any sub-block of the integrated circuit by debug access port 105. As a further example, the boot logic 108 may cause logic switch 121 to open thereby preventing the debug access port 105 from accessing the programmable processor 103. However, in the various embodiments the debug access port 105 will be allowed to send a reset 123 signal to the programmable processor 103 to cause the programmable processor 105 to reset/reboot.

Figure 2:
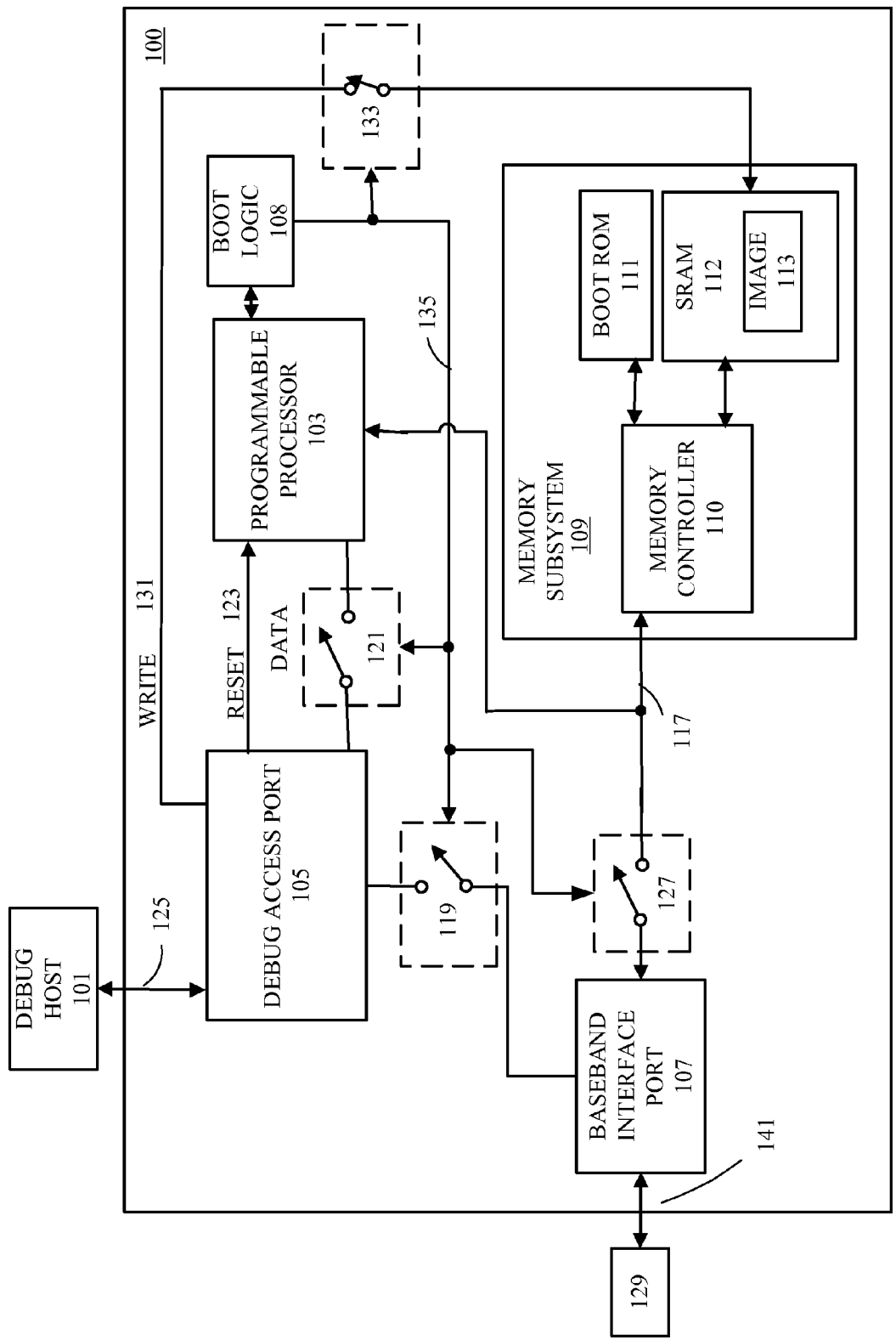
FIG. 2 is a block diagram of the integrated circuit of FIG. 1 wherein a reset is applied to a programmable processor from a debug access port and, in response, a write access is allowed such that a code image may be written to memory from the debug access port, wherein data communication between the debug access port and the programmable processor and memory is blocked.

In accordance with an embodiment, a debug host 101 may be connected to the debug access port 105 via the physical connection 125. The debug host 101 may send, through the debug access port 105, a reset signal 123 to the programmable processor 103 causing the programmable processor 103 to enter a reset state or otherwise stop operation while the reset 123 is applied. The debug host 101 may then, via the write access 131, write a code image 113 into the RAM 112 as shown in FIG. 2. FIG. 2 illustrates the function of the various embodiments in response to the programmable processor 103 receiving the reset signal 123 from the debug access port 105. In response to the reset signal 123 to programmable processor 103, the boot logic 108 will, via control signal 135, open logic switches 119, 121 and 127, thereby preventing the debug access port 105, or any device 129, from accessing the memory subsystem 109 and the programmable processor 103 respectively. However, the logic switch 133 will remain closed to allow write access 131 to the RAM 112 so that the debug access port 105 may provide the code image 113 to the RAM 112. Although write access 131 is allowed, read access to the RAM 112 will be blocked.

After the reset signal 123 is asserted from the debug access port 105 to the programmable processor 103, the logic switches 119, 121, 127 and 133, and boot logic 108 may not be in the desired state, that is, the state as illustrated by FIG. 2, wherein logic switch 133 is closed to allow write access 131. Therefore, subsequent to the reset 123 being asserted to the programmable processor 103 from the debug access port 105, a boot logic 108 reset may occur, thereby resetting the boot logic 108 and placing the logic switches into the state illustrated by FIG. 2 wherein logic switch 133 is closed to enable write access 131 to RAM 112 from the debug access port 105. The boot logic 108 reset may be achieved in some embodiments by, for example, a chip level reset that resets logic of the integrated circuit 100. In this case, the chip level reset would occur while the reset 123 remains asserted to the programmable processor 103 from the debug access port 105. After the chip level reset, which resets boot logic 108, the image 113 may be written to RAM 112 via write access 131, through the closed logic switch 133 as shown in FIG. 2. In an alternative embodiment, the boot logic 108 may be reset by a reset controller of the integrated circuit 100, where the reset controller provides reset signals to a plurality of logic within the integrated circuit 100, including programmable processor 103. In another alternative embodiment, the boot logic 108 may have a dedicated reset logic residing on the integrated circuit 100, and that resets the boot logic 108 in response to the programmable processor 103 receiving a reset 123 from the debug access port 105.

In one exemplary embodiment wherein the debug access port 105 is a JTAG debug port, the JTAG system will write a mailbox location to the RAM 112 to indicate to the boot ROM 111 that the JTAG has loaded a code image into the RAM. The mailbox location in some embodiments may include a range of address locations used for the purpose of writing by the JTAG debug port. The debug host 101 may then de-assert, that is, remove the reset signal 123 to the programmable processor 103 in which case the boot ROM 111 will run. As shown in FIG. 3 the boot ROM 111 will then, in conjunction with boot logic 108 and control signal 135, cause the logic switch 133 to open thereby preventing the debug access port 105 any further write access 131 to the RAM 112. However, in the various embodiments the debug host 101 will still be allowed to provide the reset signal 123 to the programmable processor 103.

The boot ROM 111 will now proceed to check the mailbox location which corresponds to a known location in the RAM 112 to look for the loaded code image 113. Checking the mailbox location in some embodiments may include checking a range of addresses, or range of memory locations, for a mailbox command. The mailbox command may include a numerical value that indicates that the JTAG debug port has written code to memory. In response to locating the mailbox command, the boot ROM 111 may search for the code header information. If the boot ROM 111 locates the code image 113 at the location specified in the mailbox, the boot ROM 111 may, in some embodiments, clear the mailbox memory location to ensure that it is not mistakenly used as a valid JTAG boot message during any subsequent programmable processor resets.

The boot ROM 111 will then proceed to use a security mechanism to verify that the code image 113 loaded into RAM 112 is valid code, that is, code authorized to be installed on the integrated circuit 100 via the debug access port 105. For example, the boot ROM 111 may perform a signature check upon the code image 113 or otherwise check a hash of the code image 113. Any appropriate security and validation method may be used to validate the code image 113 for the various embodiments. In some embodiments, the boot ROM 111 will first perform the security check on a header information, and, if the header information passes, will use the header information to complete a check on the code image.

If the code image 113 is determined to be invalid by the security mechanism the boot ROM 111 may continue to try to load code from another source based on, for example, bootstraps. The bootstraps may direct the boot ROM 111 to any suitable location to locate boot loader software such as for example the device 129. The bootstraps may direct the boot ROM 111 to UART, USB, NAND devices, or any other suitable port or device for locating boot loader code. However, if the code image 113 is verified, then the boot ROM 111 will parse the header of the code image 113 to determine what action to take next.

For example, in some embodiments the header information of the code image 113 may include a location and size of a boot loader code within the image 113, a destination in memory to where the code should be copied, or any other suitable information associated with the code image 113. After the boot ROM 111 parses the header, the boot ROM 111 may proceed to take the specified action such as for example copying code to a correct memory location. For example, the image 113 may include a boot loader code image 114. The boot ROM 111 may load the boot loader code image 114 into RAM 112 as shown in FIG. 3, and prepare to jump to the boot loader code 114.

Figure 4:
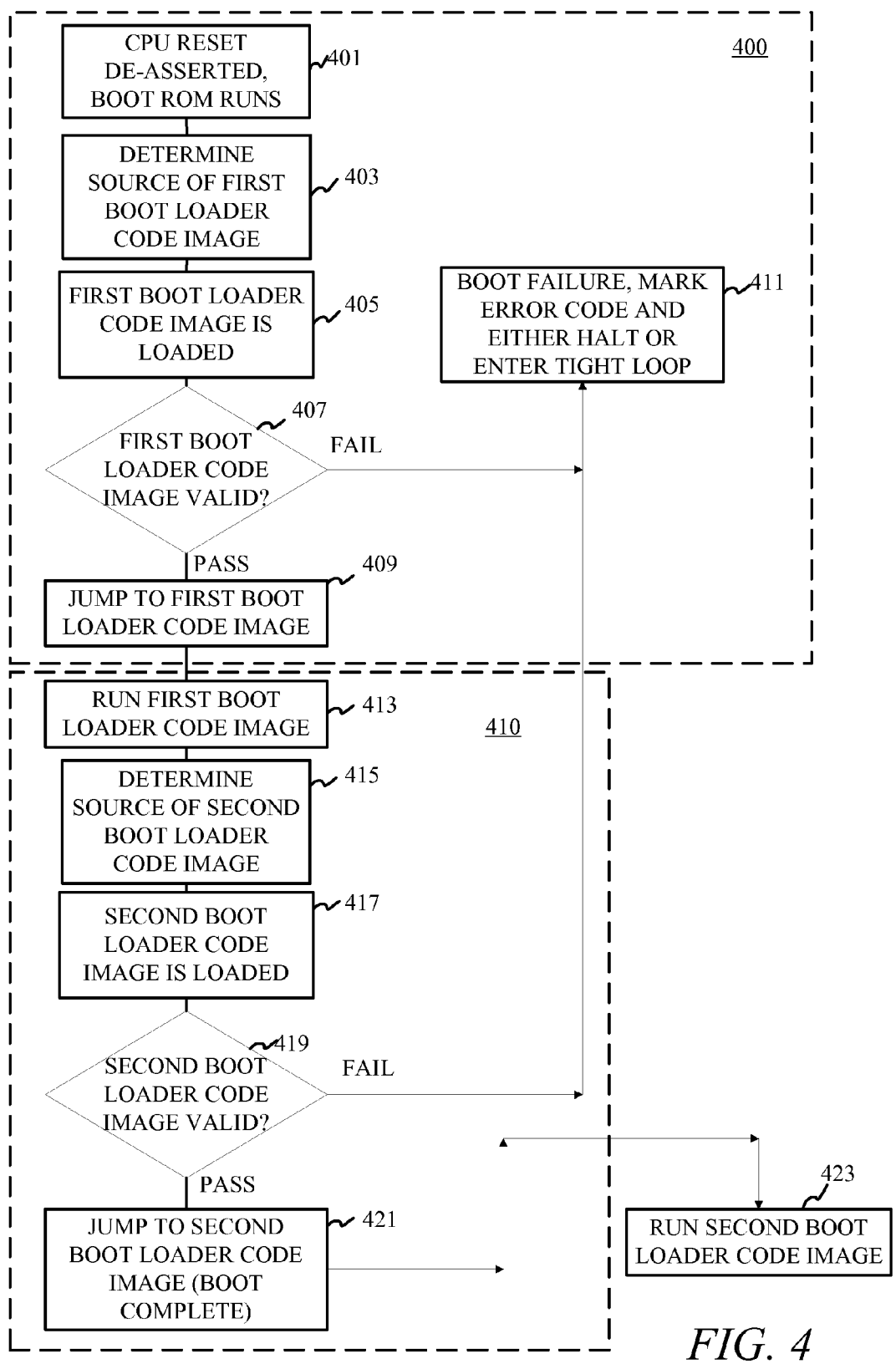
FIG. 4 is a flow chart illustrating high level operation of booting procedures in accordance with the embodiments.

FIG. 4 illustrates a boot ROM procedure in accordance with the various embodiments. The first portion of FIG. 4, shown as block 400, represents procedures run by the boot ROM 111. After the programmable processor is reset the boot ROM runs in 401 and, in 403, determines the source of a first boot loader code image such as may be included in code image 113 shown in FIG. 2. In 405 a first boot loader code image, such as boot loader code image 114, is loaded into memory. In 407 a security mechanism determines whether the first boot loader code image is valid. If the security test fails in block 407, then a boot failure may occur as shown in 411 in which case an error code may be marked and the system may be halted. In some embodiments, after the boot failure, a baseband processor will be notified, via a set of secured registers for example, and will enter into a loop. However, if the security mechanism determines that the first boot loader code is valid in 407, then the boot ROM 111 may jump to the first boot loader code image as shown in 409.

Block 410 in FIG. 4 illustrates operation of the boot loader code. Therefore in 413, the first boot loader code image runs and, in some embodiments, may retrieve a second code image which may include a second boot loader code image. In 415 the boot loader code image may now apply a security mechanism to determine the source of the boot loader code image and whether the code is valid. The first boot loader code may also load the second boot loader code image as shown in 417. If the security check shows that the second boot loader code image is valid in 419, then the second boot loader code may be jumped to in 421, completing the first boot loader procedure 410 and running the second boot loader code in 423.

The first boot loader code as shown in block 410 may be generic code, that is, independent of any specific platform of the integrated circuit 100. However, the second boot loader image as shown in block 423 may be platform dependent code. Further, the second boot loader code may not be an actual boot loader code but may be any suitable code as would be understood by one of ordinary skill. Further, after the boot ROM 111 jumps to the boot loader code 114, the boot loader code 114 is free to either allow access by the debug access port 105 or block access by the debug port 105. The boot loader image 114 may perform additional initiation of various blocks of the integrated circuit 100 and/or may load additional trusted secure software in some embodiments.

Figure 5:
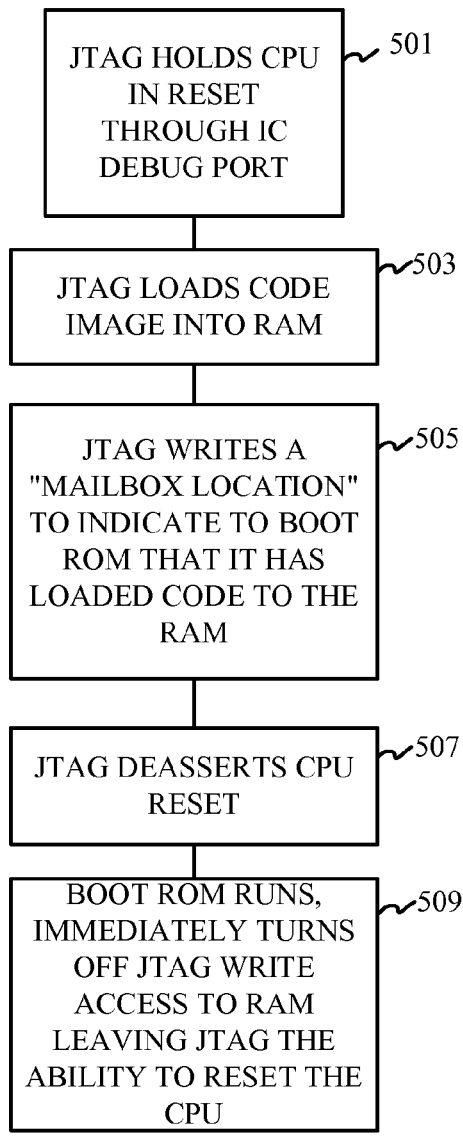
FIG. 5 is a flow chart illustrating operation of a booting procedure with a boot loader provided via a JTAG debug access port.

FIG. 5 illustrates operation of an embodiment wherein the debug access port 105 is a JTAG debug access port. In 501 the JTAG port holds the programmable processor in a reset condition through the integrated circuit JTAG debug port. In 503 the JTAG loads a code image into the RAM. In 505 the JTAG writes a mailbox location in RAM to indicate to the boot ROM that it has loaded code to the RAM. In 507 the JTAG de-asserts the programmable processor reset and in 509 the boot ROM 111 runs, turning off the JTAG write access to the RAM 112 but leaving the JTAG the ability to reset the programmable processor.

Figure 6:
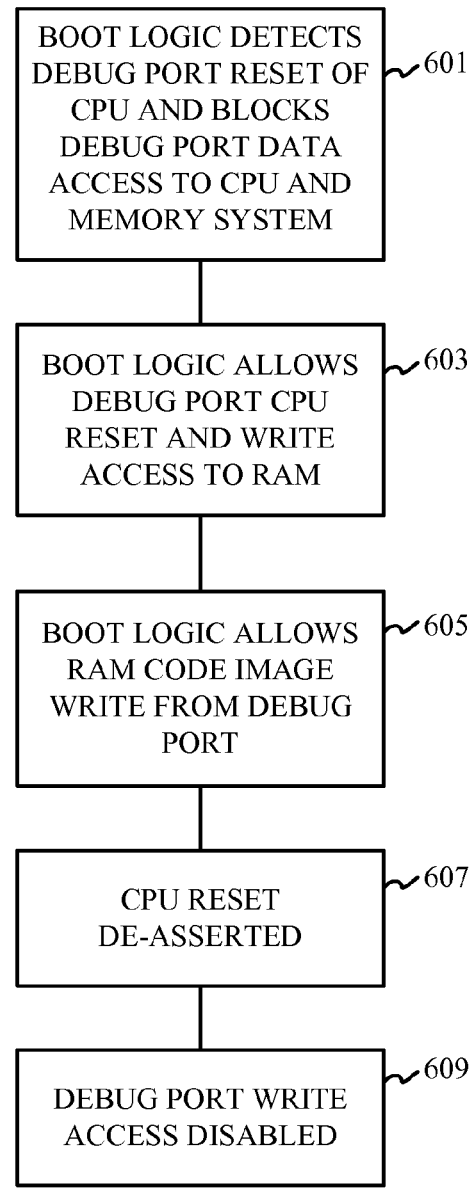
FIG. 6 is a flow chart illustrating a method of operation in accordance with an embodiment.

FIG. 6 illustrates operation of the boot ROM 111 in accordance with an embodiment. In 601 the boot logic 108 detects that the debug port has reset the programmable processor and blocks the debug port from any data access to the programmable processor and from any access to the memory system. In 603 the boot logic 108 allows the debug port reset access to the programmable processor and also allows the debug port write access to the RAM 112. In 605 the boot logic 108 allows a RAM code image 113 to be written from the debug port. When the programmable processor 103 reset is de-asserted as shown in 607, the boot ROM 111 code will be able to run on the programmable processor 103, and will immediately disable the debug port 105 write access 131 as shown in 609. For example, this may be accomplished in conjunction with the boot logic 108, causing logic switch 133 to open and thereby block write access 131. This action prevents any possible unauthorized modification of the code image in RAM 112 prior to the code image being run by the programmable processor 103.

Figure 7:
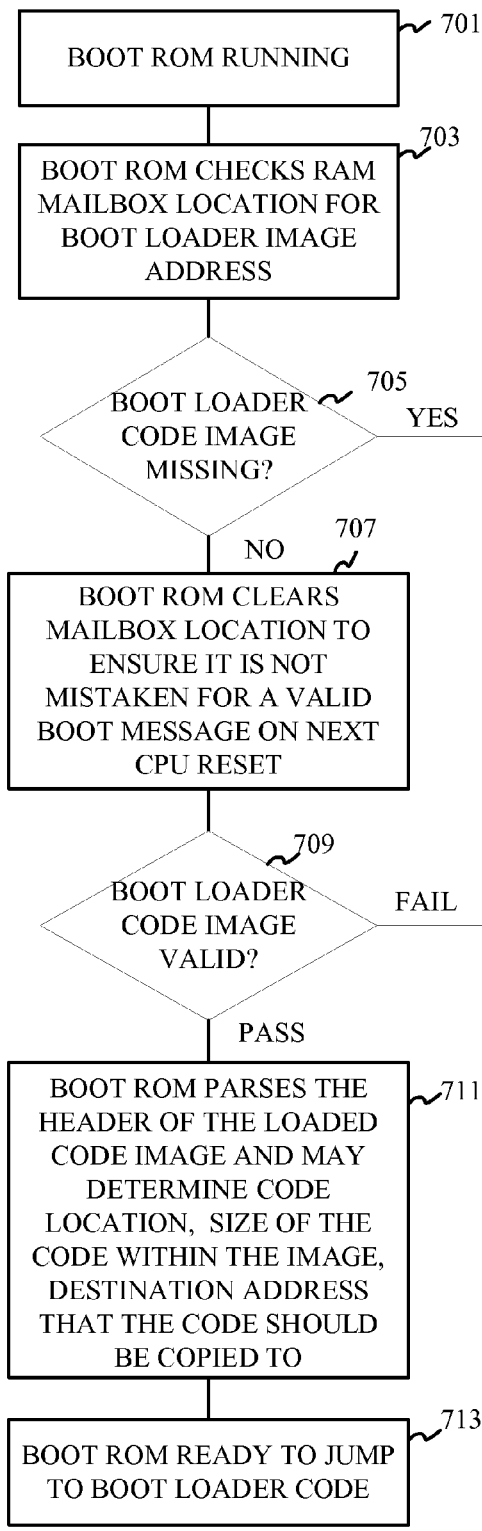
FIG. 7 and FIG. 8 are flow charts illustrating further details of operation of methods in accordance with the embodiments.

FIG. 7 illustrates additional details of operation in accordance with the embodiments. In 701 the boot ROM 111 is already running and in 703 checks the RAM 112 mailbox location written by, for example, a JTAG debug operation where the mailbox location indicates a boot loader code image address in memory. In 705 the boot ROM 111 then checks the indicated address location for the boot loader code. If the image is missing, the boot ROM 111 will continue with a boot strapping operation as in 715, and, in 717, will check a next source such as, but not limited to, NOR or NAND device ports, UART ports, or other external devices as determined by the boot strapping in 715. However, if the boot loader code image is present, then in 707 the boot ROM 111 may clear the mailbox address location to ensure that the message contained there will not be mistaken for a valid boot message on a subsequent programmable processor reset.

In 709 the boot ROM 111 uses a security mechanism to determine whether the boot loader code image is valid. If the boot loader code image fails the security test, the boot ROM 111 may proceed with boot strapping in 715, and in 717 check the next source for a valid image in accordance with the boot strapping indication of 715. However, if the boot loader code image is valid in 709, then in 711 the boot ROM 111 will parse the header of the code image to determine, for example, location, size of the code within the image or a destination address in memory to where the code should be copied in some embodiments. In 713 the boot ROM 111 is ready to jump to the boot loader code.

Figure 8:
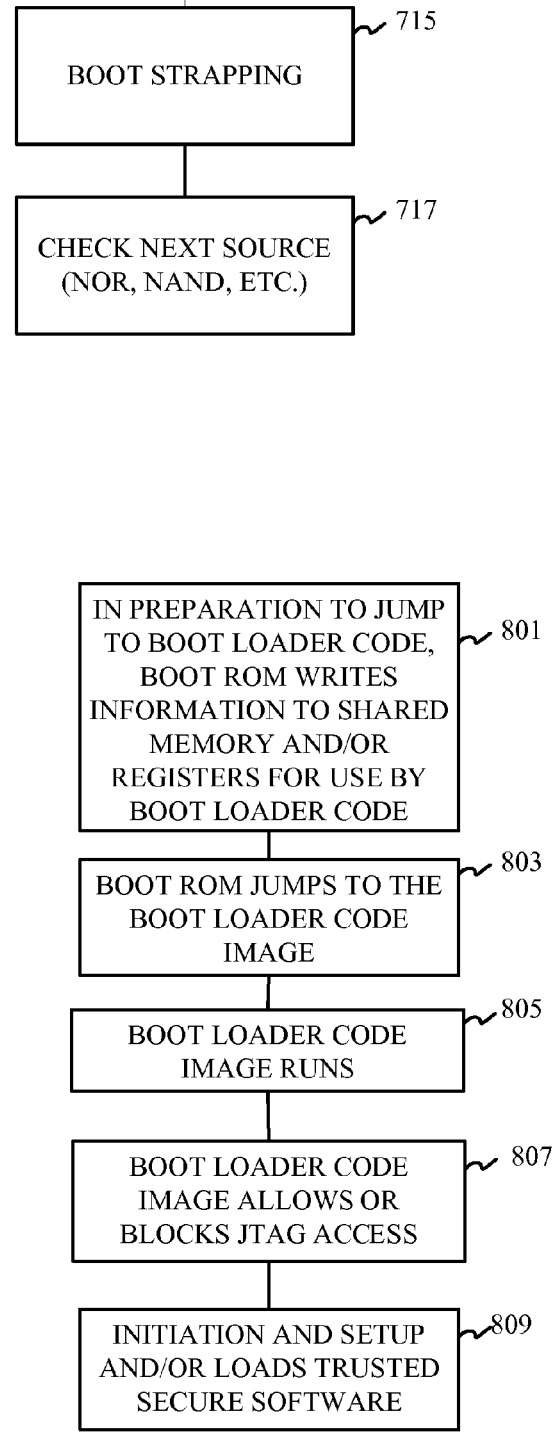

FIG. 8 illustrates an additional embodiment continuing from the embodiment shown in FIG. 7. For example, in 801 the boot ROM 111 may, in preparation to jump to the boot loader code, write information to shared memory and/or registers for use by the boot loader code. Subsequently in 803 the boot ROM 111 may jump to the boot loader code image wherein the boot loader code image runs as shown in 805. In 807, the boot loader code image may allow access or block access to the debug port 105, such as a JTAG debug port. In 809 the boot loader code may perform additional initiation of blocks on the integrated circuit 100 and/or load additional trusted secured software which may be obtained from and external source, such as for example, the device 129.

Therefore, various applications of the herein disclosed embodiments will become apparent to one of ordinary skill. For example, the embodiments herein disclosed may be useful for initial debugging procedures or debugging procedures after a specific platform has been used for the integrated circuit 100, wherein the software or operating system has failed to run because of problems with the operating system or software. Further, the embodiments herein disclosed may be useful for prefabricated phones that are prefabricated with no software but need to have trusted code installed from, for example, a flash memory. Also, as would be understood by one of ordinary skill, once the boot loader image is loaded from the debug port, such as for example, a JTAG debug port, the boot loader code image may provide access to the debug port via authentication certificates such that a debug host such as, for example, debug host 101, may perform further operations via the debug access port.

The security mechanisms employed by the boot ROM 111 in order to validate the boot loader code image loaded through the debug access port may include, for example, private/public key pair validation or other encryption and validation techniques as would be understood by one of ordinary skill. For example, the boot loader code may check a signature of the boot loader code image wherein the signature is a hash of the code image, the hash being encrypted by, for example, a private key, where the public key may be stored by the boot ROM 111.

The above detailed description and the examples described therein have been presented for the purposes of illustration and description only and not by limitation. For example, the operations described may be done in any suitable manner. The method steps may be done in any suitable order still providing the described operation end results. It is therefore contemplated that the present embodiments cover any and all modifications, variations or equivalents that fall within the spirit and scope of the basic underlying principles disclosed above and claimed herein.

What is claimed is:

1. A method comprising:
    receiving a programmable processor reset command from a debug access port of an integrated circuit;
    blocking, by a boot logic upon said reset of a programmable processor on the integrated circuit, commands to said programmable processor from said debug access port, while still allowing said reset command to said programmable processor to be asserted from said debug port; and allowing, by said boot logic, write access to memory by said debug access port to receive a boot loader code image written to said memory while said reset command is asserted.

2. The method of claim 1, comprising:
blocking, by said boot logic upon said reset command, commands to a memory subsystem from said debug access port.

3. The method of claim 1, comprising:
validating, by said boot logic, said boot loader code image as valid code by performing a security check on said boot loader code image; and
jumping, by said boot logic, to said boot loader code image thereby allowing said boot loader code image to run on said programmable processor.

4. The method of claim 1, after allowing, by said boot logic, write access to memory by said debug access port to receive a boot loader code image written to said memory, comprising:
turning off, by said boot logic, said write access to said memory via said debug port after said boot loader code image is written to said memory.

5. The method of claim 4, comprising:
executing a boot software by said programmable processor in response to said reset command being de-asserted;
wherein turning off, by said boot logic, said write access to said memory via said debug port after said boot loader code image is written to said memory, comprises turning off said write access in response to said reset command being de-asserted.

6. The method of claim 1, wherein allowing, by said boot logic, write access to memory by said debug access port to receive a boot loader code image written to said memory, further comprises:
enabling access of said memory through another interface port, different than said debug port; and
turning off, by said boot logic, write access to said memory via said interface port in response to de-assertion of said programmable processor reset command from said debug port.

7. The method of claim 1, wherein allowing, by said boot logic, write access to memory by said debug access port to receive a boot loader code image written to said memory, further comprises:
allowing write access to a memory mailbox location of said memory to receive an address where said boot loader code image was written to in said memory via said debug port such that said boot loader code image can be located, said memory mailbox location being a known memory location for writing said address for retrieval by said boot logic.

8. The method of claim 7, further comprising:
checking, by said boot logic, said memory mailbox location for said address, said address corresponding to the location of said boot loader code; and
clearing by said boot ROM, said known memory mailbox location.

9. The method of claim 8, further comprising:
locating, by said boot logic, said boot loader code using said address;
verifying, by said boot ROM, that said first boot loader code is valid by applying a security check to said boot loader code; and
parsing a header of said first boot loader code to obtain boot loader code information.

10. The method of claim 8, further comprising:
locating, by said boot logic, said boot loader code using said address;
determining, by said boot ROM, that said boot loader code is invalid by applying a security check to said boot loader code; and
checking a next source for said boot loader code based on bootstrapping.

11. The method of claim 7, further comprising:
determining, by said boot logic, that said boot loader code is not present at said address; and
checking a next source for said boot loader code based on bootstrapping.

12. The method of claim 8, wherein said header contains boot loader code information comprising:
boot loader code location and code size; and
a destination address to where said first boot loader code should be copied by said boot logic.

13. An integrated circuit comprising:
a debug access port;
a programmable processor coupled to said debug access port;
said programmable processor operative to receive a reset command from said debug access port, and to transmit data to, and receive data from, said debug access port; and
a boot logic, operative to block, upon a reset of said programmable processor corresponding to a reset command from said debug access port, commands to said programmable processor from said debug access port, while still allowing said reset command to said programmable processor from said debug port; and
while allowing write access to memory by said debug access port to receive a boot loader code image written to said memory.

14. The integrated circuit of claim 13, comprising:
a memory system operatively coupled to said debug access port; and
wherein said boot logic is further operative to:
block, upon said reset command of said programmable processor being de-asserted, commands to said memory subsystem from said debug access port.

15. The integrated circuit of claim 13, wherein said boot logic is further operative to:
validate that said boot loader code image is valid code by performing a security check on said boot loader code image; and
jump to said boot loader code image thereby allowing said boot loader code image to run on said programmable processor.

16. The integrated circuit of claim 13, wherein said boot logic is further operative to:
turn off said write access to said memory via said debug access port after allowing a boot loader code image to be written to said memory via said debug access port.

17. The integrated circuit of claim 13, wherein said boot logic is operative to allow write access to memory by said debug access port to receive a boot loader code image written to said memory, by being further operative to:
enable access of said memory through another interface port, different than said debug port; and
turn off write access to said memory via said interface port in response to de-asserting said programmable processor reset command from said debug access port.

18. The integrated circuit of claim 13, wherein said boot logic is further operative to:

allow write access to a memory mailbox location of said memory to receive an address where said boot loader code image was written to in said memory via said debug port such that said boot loader code image can be located, said memory mailbox location being a known memory location for writing said address for retrieval by said boot logic;

check said memory mailbox location for said address, said address corresponding to the location of said boot loader code; and clear said memory mailbox location.

19. The integrated circuit of claim 18, wherein said boot logic is further operative to:

locate said boot loader code using said address;

verify that said boot loader code is valid by applying a security check to said boot loader code; and parse a header of said first boot loader code to obtain boot loader code information.

20. An integrated circuit comprising:

a debug access port;

a memory system operatively coupled to said debug access port;

a programmable processor coupled to said debug access port;

said programmable processor operative to receive a reset command from said debug access port, and to transmit data to, and receive data from, said debug access port; and a boot logic, operative to:

block, upon a reset of said programmable processor corresponding to a reset command from said debug access port, commands to said programmable processor from said debug access port, while still allowing said reset command to said programmable processor from said debug port; and while allowing write access to memory by said debug access port to receive a boot loader code image written to said memory;

block, upon reset of said programmable processor, commands to said memory subsystem from said debug access port;

turn off said write access to said memory via said debug access port after allowing a boot loader code image to be written to said memory via said debug access port;

validate that said boot loader code image is valid code by performing a security check on said boot loader code image; and jump to said boot loader code image thereby allowing said boot loader code image to run on said programmable processor.

* * * * *